Jan. 26, 1937.  F. SCHIESSER  2,068,822
POINT LOCATING DEVICE
Filed April 19, 1933
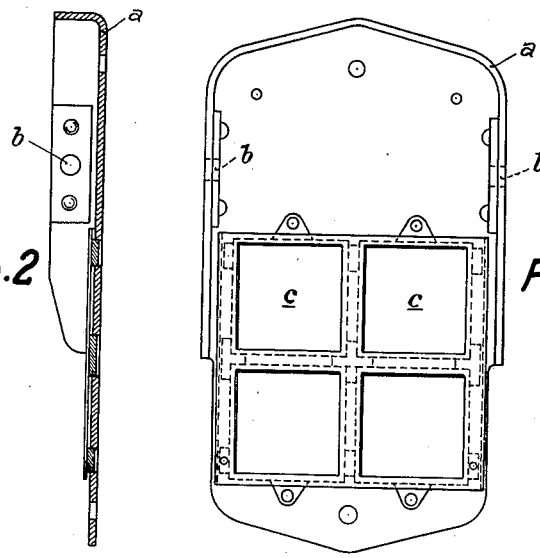
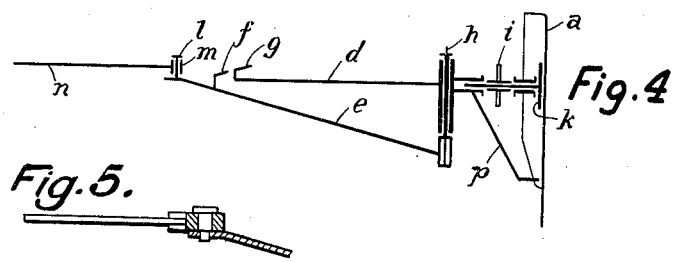
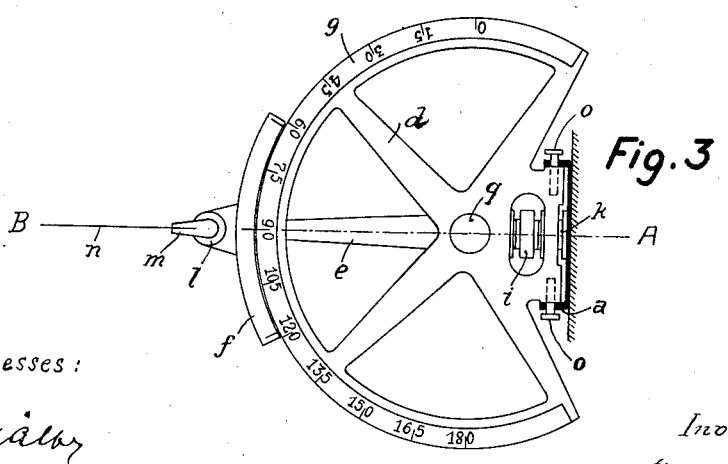

Patented Jan. 26, 1937

2,068,822

UNITED STATES PATENT OFFICE 2,068,822

POINT LOCATING DEVICE

Fridolin Schiesser, Rheineck, Switzerland

Application April 19, 1933, Serial No. 666,884
In Switzerland April 25, 1932

1 Claim. (Cl. 33—1)

The control, regulating and servicing means, facilities and connections of the various underground public utility installations within city limits are located within the right-of-way of streets mostly and are liable to be covered by snow or otherwise difficult to relocate. In such cases, however, it is of very great importance that such installations may be quickly and accurately relocated and uncovered in case of need. The present invention relates to such a device for quickly and accurately ascertaining and finding servicing facilities and openings of underground public utility installations lying below the surface of and within the right-of-way of city streets, provided, however, that their position be positively known as to bearing and distance from any given fixed point.

The device at hand consists of a support to be rigidly and permanently attached to such a fixed point, whereby the latter preferably is located on the outside walls of buildings or other permanent structures and at such a height above ground that a person may easily reach it for purposes hereinafter described. Said support, when being used, is combined with a large-size protractor detachably and rotatively pivoted thereon, and the data necessary for relocating the point in question—such as the distance from said support and the bearing with relation to the wall of a structure—preferably are inserted in their numerical amounts on small shields sliding into said support. The said protractor may be brought along by the operator in any given instance or may be enclosed in said support and taken out in case of need. Said support thus may contain a whole number of exchangeable shield-slides on which the survey-data of different connections of water and gas mains, telephone and fire-alarm lines and the like may be registered for handy reference.

By way of example, the invention is illustrated in the accompanying drawing, in which Fig. 1 is a front view of the support for the goniometer, Fig. 2 a longitudinal section through this support, Fig. 3 a top view of the device, Fig. 4 a section on the line A—B in Fig. 3, in schematic representation, and Fig. 5 a view in section of the bearing on which is attached the end-piece of the measuring tape.

In a support $a$ placed against a wall or on a separate support, bores $b$ are fitted, which serve for the fixing of a goniometer. The support $a$ is further provided with shields $c$, on which the polar coordinates of locations in respect of the center $q$ as pole to be found, as for instance hydrants and other fittings lying under the ground and therefore not visible, are registered. The goniometer consists of a limb $d$ provided with graduations $g$ and an arm $e$, which pivots on an axis $h$ at the center $q$ of the limb $d$. The arm $e$ carries a vernier $f$, which coacts with the graduations $g$ of the limb $d$. Said arm $e$ is provided in front with a stud or pivot $l$. The tape $n$ is equipped with an end-piece $m$ in form of a ring or strap to be slipped over said stud $l$. The goniometer is fixed on the support $a$ by means of pins $o$ and is held by means of a support $p$. In order that the center $q$ of the limb $d$ can be adjusted exactly, a male screw $k$ is provided with a nut $i$ on it. By turning this nut, the distance of the center $q$ from the support $a$ can be adjusted.

If a certain location is to be found, the goniometer is fixed on the support $a$ by means of the pin $o$ and adjusted. The direction of the location to be found is ascertained by means of the vernier $f$ and its distance by means of the measuring tape $n$.

I claim:

In a device for locating points from a known, fixed location, a support adapted to be fixed at said location, a goniometer, consisting of a graduated limb, means detachably pivoting said limb on said support on an axis substantially in the plane of said limb, an arm pivoted at the center of said limb and bearing an index coacting with the graduations thereof, and means on said arm adapted to detachably hold the end of a measuring tape.

FRIDOLIN SCHIESSER.